Oct. 21, 1941.                H. H. ORR                2,260,191
            MACHINE AND METHOD FOR MANUFACTURING BAGS
                    Filed May 3, 1938          10 Sheets-Sheet 1

Howard H. Orr
INVENTOR
BY Walter C. Kelsey
ATTORNEY

Oct. 21, 1941. H. H. ORR 2,260,191
MACHINE AND METHOD FOR MANUFACTURING BAGS
Filed May 3, 1938 10 Sheets-Sheet 2

Fig 2

Howard H. Orr
INVENTOR
BY Walter C. Kelsey
ATTORNEY

Oct. 21, 1941.  H. H. ORR  2,260,191
MACHINE AND METHOD FOR MANUFACTURING BAGS
Filed May 3, 1938   10 Sheets-Sheet 3

Howard H. Orr
INVENTOR
BY Walter C. Kelsey
ATTORNEY

Oct. 21, 1941.   H. H. ORR   2,260,191
MACHINE AND METHOD FOR MANUFACTURING BAGS
Filed May 3, 1938   10 Sheets-Sheet 6

Howard H. Orr
INVENTOR
BY Walter C. Kelsey
ATTORNEY

Oct. 21, 1941.  H. H. ORR  2,260,191
MACHINE AND METHOD FOR MANUFACTURING BAGS
Filed May 3, 1938  10 Sheets-Sheet 7

Howard H. Orr
INVENTOR
BY Walter C. Kelsey
ATTORNEY

Patented Oct. 21, 1941

2,260,191

UNITED STATES PATENT OFFICE 2,260,191

MACHINE AND METHOD FOR MANUFACTURING BAGS

Howard H. Orr, Cleveland, Ohio, assignor to The Jaite Company, Jaite, Ohio, a corporation of Ohio Application May 3, 1938, Serial No. 205,771

10 Claims. (Cl. 112—10)

This invention relates to a machine and method for manufacturing bags of the, so called, closed end type, having a small opening at one end to allow the introduction of material therein, such bags frequently are formed of multi-ply bag stock, and may or may not be provided with side gussets.

Bags of this description may be formed from continuous multi-ply tubes, which are cut to requisite bag length in a well known manner, and may be provided with gussets along the sides; Paper tape may be secured to the bottom of the bag by a sewing operation or by means of an adhesive, or by any suitable means. A valve, permitting the introduction of material into the side corner of the bag, and preventing the material from leaking from the filled bag by the weight of the material against the valve, is formed by tucking in or folding the upper gusset corner of the bag, in a well known manner, and then a strip of tape is sewn across the upper margin of the bag to seal it.

The forming of such valves requires several distinctive time-consuming operations, which may be performed by various means, well known to the art. This type of valve does not readily accommodate filling spouts of all sizes, and possesses a distinct disadvantage, in that it does not always provide a leak proof bag, this disadvantage is especially noticeable when finely divided granular materials such as cement and the like, are packed in such bags.

I have discovered that an opening for the introduction of material, may be provided along the upper margin of a tape sealed bag end, by simple and effective means, by merely offsetting the line of stitches in such tape along the bag engaging margin thereof near one side of the bag, in such manner that the stitches will continue to proceed through the tape, but will lie above the upper margin of the bag, and thus that portion of the tape receiving the offset stitches overlies an unstitched or open portion of the bag, through which material may be introduced into the bag by means of a filling spout, or otherwise. Such portion of the tape having the offset stitching may be readily lifted away from the top margin of the bag, and may be conveniently secured thereto after the filling operation, by stapling, sewing or by the use of adhesives, or in any other suitable manner, and lies substantially flush with the top bag margin without buckling and provides a leak proof seal for the bag.

Mechanism for accomplishing the foregoing results may be conveniently incorporated into standard bag manufacturing devices, by providing means for offsetting the line of stitching through the bag sealing tape and permits the stitching operation to proceed continuously.

Somewhat similar results may be accomplished by folding or rolling over a corner of the bag and keeping it in such condition, before the stitching operation proceeds along that portion of the bag. This folded over corner is then available for the filling operation, and may be folded back to its original position and secured to that part of the tape overlying the folded over corner, by any suitable means, as by stapling, sewing or by the use of adhesives.

Another means for accomplishing much the same results, is by providing a cut out portion along the top bag margin along one end, in such manner that, the top margin of such cut out portion lies above the lower margins of the tape and yet is below the line of the stitches, in order that the stitching may continue in a straight line through the tape, wihout engaging the margins of the bag, and thus an overlying portion of the tape unstitched to the bag, permits the filling of the bag, and may be secured thereto, as above described.

It, therefore, is an object of this invention, to provide in a bag machine, means for offsetting the line of stitching through tape along a bag margin in such manner, that the sewing proceeds as a continuous operation, and yet is offset to sew through the tape only near one side of the bag without sewing the tape to the bag, and thus provide a filling means, such means being adapted to be incorporated into existing bag machines, at a nominal cost.

Another object is to provide a bag machine adapted to simultaneously sew tape at both ends of the bag and to provide means for offsetting such sewing at one end of the bag to provide means for filling the bag, such sewing operations being conducted entirely automatically and at a high rate of speed.

Another object is, to provide means for manufacturing a bag having a portion adapted to receive a filling spout, such means being readily secured to the bag in such manner as to prevent the leaking out of the bag contents therefrom.

Another object is to provide means for manufacturing bags having spout receiving portions the size of which may be quickly and easily varied in width.

Still another object is, to provide means for manufacturing a relatively low cost bag, having a filling spout portion, such bag being adapted to package a wide range of different materials such as cement and the like, and bituminous materials, such as mineral pitch, asphalt and many others.

Yet other objects are to provide a simple economical and practical opening and closing device adapted to be used for single-ply, multi-ply, gusseted or plain bags and containers of many different types.

Other and further objects of this invention will be apparent during the course of the following description:

In the drawings, forming a part of this specification.

Figure 1:
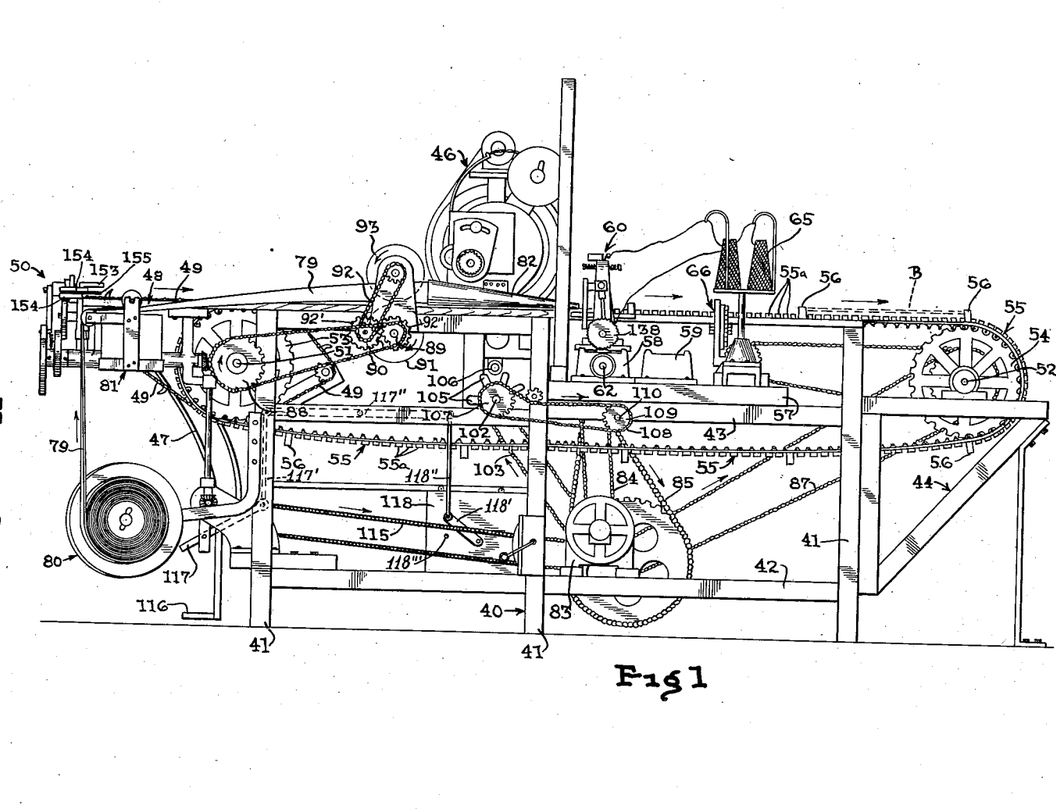
Fig. 1 is a side elevational view of a machine, illustrating an embodiment of my invention.
Figure 2:
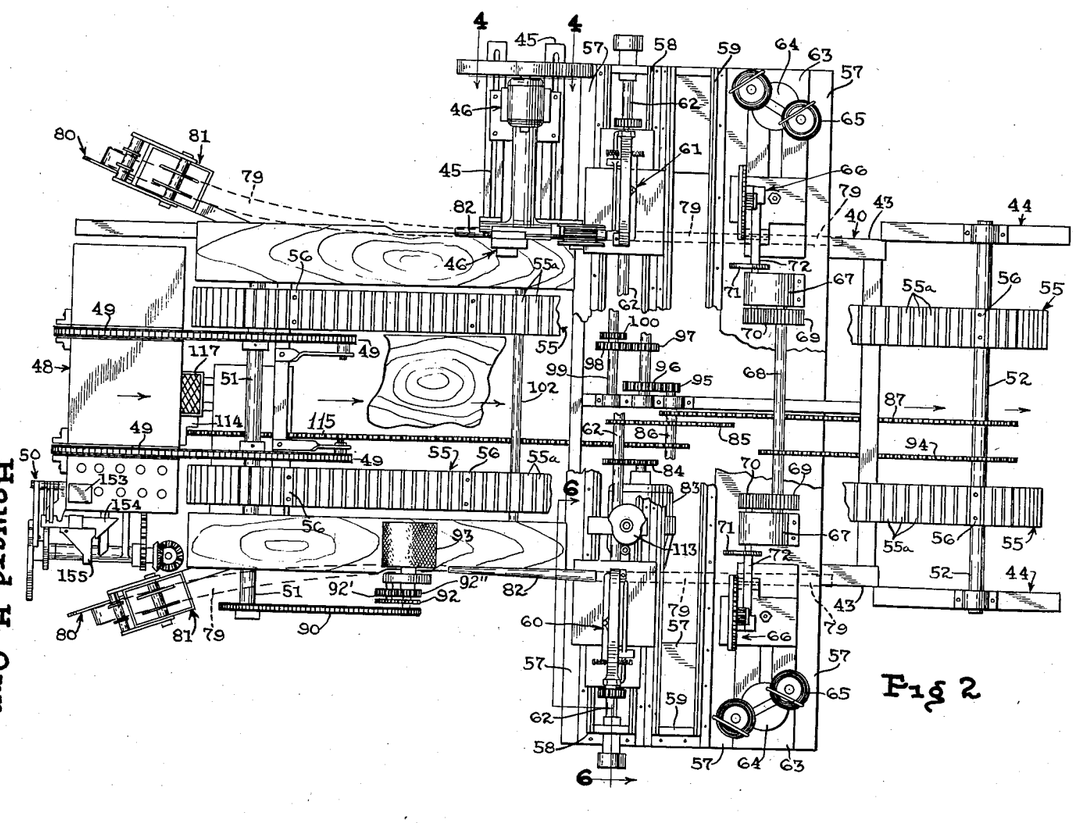
Fig. 2 is a plan view of the machine, with parts broken away.
Figure 3:
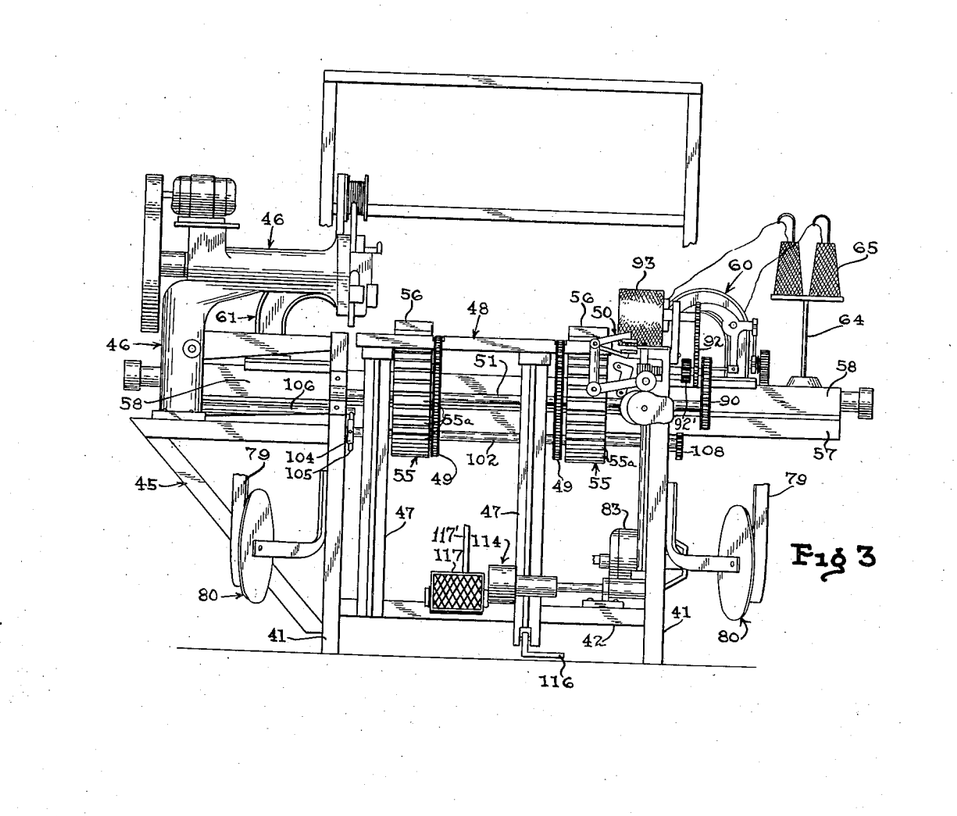
Fig. 3 is an end elevation of the machine, looking toward the receiving end of the machine.

Referring to the drawings, and more particularly Figs. 1 through 3, the bag machine constituting an illustrative embodiment of my invention, comprises a supporting frame 40 mounted on supporting legs 41 supporting undercarriage 42 and table supports 43, while a sub-support frame 44, located at the discharging end of the machine, and a sub-frame 45 located at one side of the machine, are cooperatively connected to the frame 40 which may be made of angle iron or any other suitable material. A stapling device 46, adapted to insert staples in bag ends in a well known manner, is mounted on the sub-frame 45. A flat plate 48 recessed to accommodate endless chains 49, serving to convey the bags after the operator has placed them on the receiving plate 48, is detachably secured to the receiving end of the machine by suitable means, such as columns 47. A gusset valving mechanism 50 is mounted on one corner of the plate 48 which is fully described in my Patent No. 1,926,241, issued September 12, 1933, and therefore said mechanism is described in a general manner.

An axle 51, suitably mounted on the supporting legs 41, supports two juxtapositioned sprockets 53, while an axle 52, mounted on the sub-support frame 44, carries two similar sprockets 54, aligned with the sprockets 53, and positioned at opposite ends of the machine. Endless belts 55, operatively mounted on the sprockets 53 and 54, support bag conveying means in the form of a series of small spaced wooden blocks 55a, having certain of said blocks 56 raised at predetermined distances apart from each other corresponding to the width of a bag, to receive and convey bags through said machine in the direction indicated by the arrows on the drawings.

A base 57, of any suitable material, is mounted on the table support 43, while secured thereto are two channel mountings 58 and 59, extending the width of the machine and protruding beyond the marginal edges thereof. Sewing heads 60 and 61 are mounted on the channel mountings 58, and are adapted to sew tape on the opposite ends of bags, and may be of any well known design, and as such sewing heads are well known in the art, a detailed description of the same is omitted herein. A spline-shaft 62 mounted centrally of the channel mounting 58 serves a purpose hereinafter described. A pair of stands 64, adapted to support skeins of thread 65 for the sewing heads 60 and 61, are detachably mounted on a mounting plate 63 secured to the base 57.

Figures 4, 5:
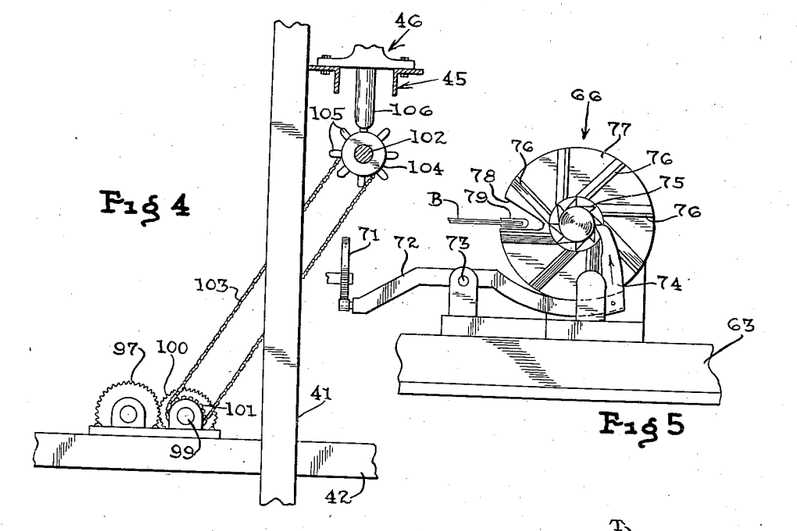
Fig. 4 is a fragmentary vertical section taken on the line 4—4 of Fig. 2 showing means for actuating the stapling attachment.
Fig. 5 is a partial sectional view of one of the cutting knives for severing tape.

A pair of devices for severing the tape beyond the bag margins as shown in Fig. 5 are detachably mounted on mounting plate 63, and as shown at 66, comprise a pair of pillow blocks 67, supporting a shaft 68 and gears 69 and 70, which operate cams 71, which as best shown in Fig. 5 actuates arms 72, pivotally mounted at 73, having fingers 74 adapted to engage the flattened portions of a ratchet 75, formed integrally with cutting blades 76, rotatably mounted on a stationary circular plate 77, provided with a segment shaped aperture 78. The construction and arrangement of said cutting devices 66 are such that, tapes 79 sewn to the ends of a bag B are severed by the blades 76 whenever they are forced past the apertures 78 by the cooperation of cams 71, arms 72 and fingers 74. A pair of sealing tape containers 80, supported on the legs 41, on opposite sides of the machine at the receiving end of the machine, are adapted to hold rolls of sealing tape 79, and from such containers 80 the tape passes through an adhesive applying mechanism illustrated generally at 81, and then passes through folding dies 82, which may be of any well known construction, adapted to fold the tape over the ends of a bag B.

Suitable motive power for operating the machine is furnished by an electric motor 83, driving splineshaft 62 through a cooperating chain belt 84, while a belt 85 drives axle 86, which in turn drives the axle 52 through belt 87, thus actuating the endless belts 55, and the wooden conveyor blocks 55a through the axles 51 and 52. Sprockets, not shown in the drawings, mounted on the axle 51, carry endless chains 49 which travel when endless belts 55 are moving. A sprocket 88 secured to one end of the axle 51 drives a sprocket 89 by means of a chain belt 90, while a knurled roller 93 is driven by a belt 92 cooperating with the sprocket 89. Through a pair of spur gears 92' and 92" the gear 92" operably connected to shaft driven by the sprocket 89, meshes with gear 92' which causes the chain belt 92 operating on sprockets to rotate the knurled roller 93 in direction of arrow. The axle 52 drives shaft 68 by means of a belt 94. A gear 95, mounted on the end of the shaft 86, engages gear 96, while gears 97 and 98 cooperate with gear 96 forming a transmission unit, which drives stapling device 46 and a cam 113. Gear 100 is detachably mounted on a shaft 99 for the purpose of synchronizing the speed of the transmission unit. A sprocket 101, mounted on the end of shaft 99, as shown in Fig. 4, drives a shaft 102 by means of a belt 103, while a circular finger holder 104 having radially extending fingers 105, is mounted on the shaft 102. The stapling device 46 is actuated by means of an arm 106 moved by the fingers 105 when the shaft 102 is rotated.

The number and position of fingers 105 determine the number of staples inserted into a bag, and if desired, the stapler 46 may be adjusted to insert one staple each time the arm 106 is actuated by the finger 105. A sprocket 107, as shown in Fig. 1, is mounted on the opposite end of the shaft 102, which, by means of a chain belt 108 operates a sprocket 109 driving a shaft 110, which in turn by means of gears 111 and 112 rotates the cam 113, as shown in Fig. 6.

The gusset-valving mechanism 50 is driven from the chain belt 115, mounted on axle 86, through the one revolution clutch 114 which is operated whenever the operator actuates foot pedal 116, while another foot pedal 117, is operable through connecting rod 117' which in turn connects the lever 117" operating on a center pivot, the other end of lever 117" is connected to a rod 118" then down to the contact arm 118' of the starting switch 118. When pedal 117 is depressed it puts into motion the above linkage which in turn causes the downward movement of the contact arm 118' forming contact on point 118''' thus controlling motor 83.

Figures 6, 7, 8, 9:
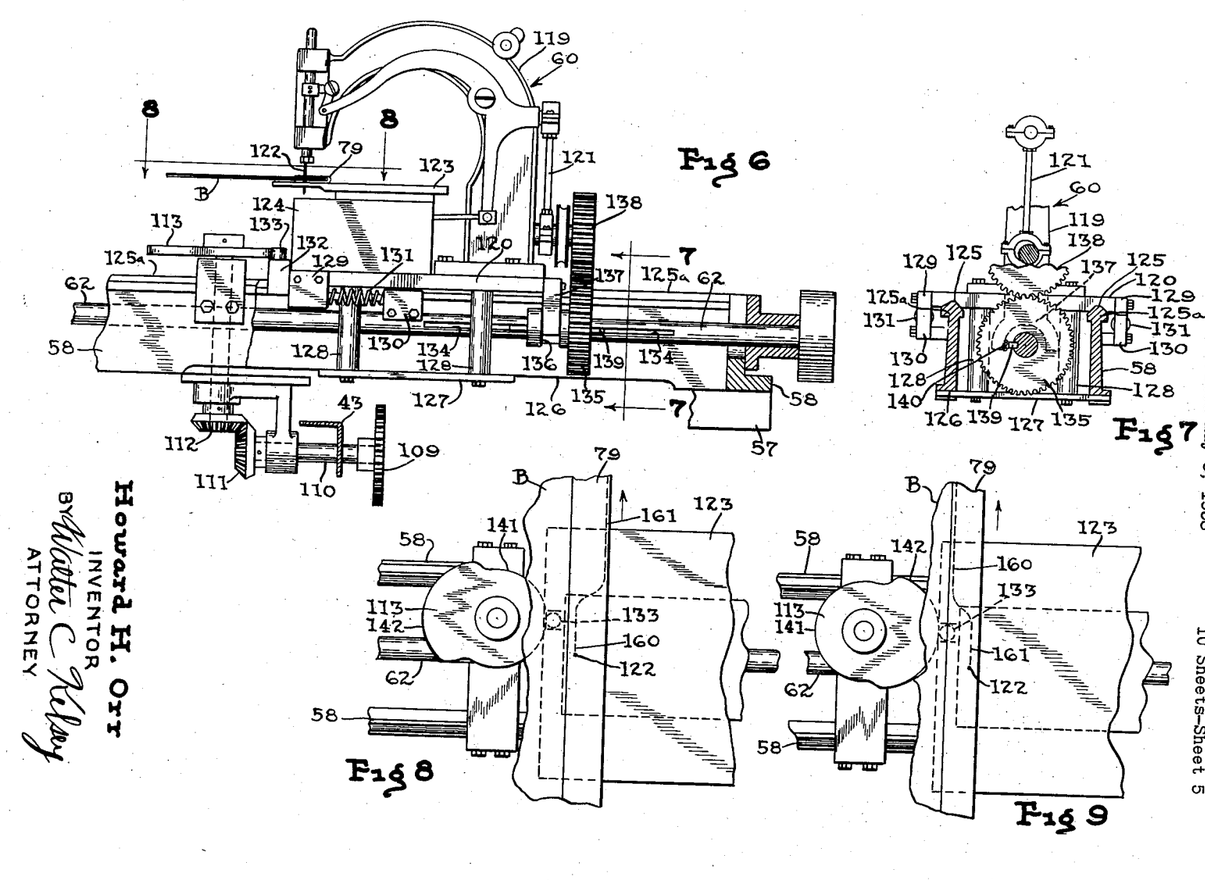
Fig. 6 is a transverse sectional view of the sewing head taken on the line 6—6 of Fig. 2.
Fig. 7 is a transverse sectional view taken on the line 7—7 of Figure 6.
Fig. 8 is a partial plan view taken on the line 8—8 of Figure 6 showing the cam in one position.
Fig. 9 is a similar view showing the cam in another position.
Figure 10:
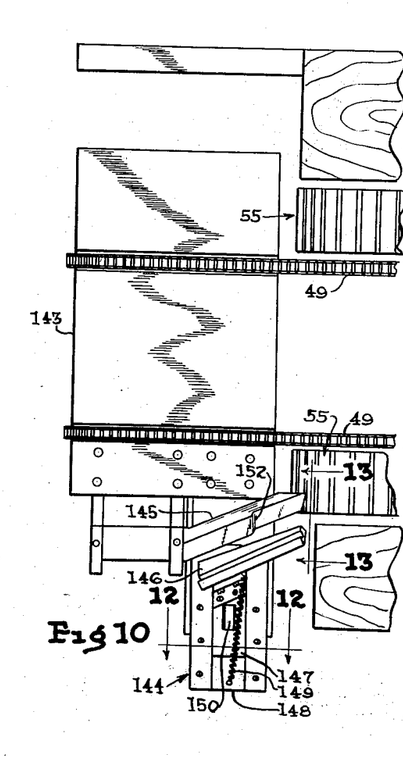
Fig. 10 is a top plan view of a modified form of valve forming means.

Sewing head 60, shown in Figs. 6 through 9, is similar to sewing head 61, and comprises generally a frame 119 secured to a recessed base 120, and a connecting rod 121, adapted to reciprocate a needle 122, for sewing folded sealing tape 79 to the opposite margins of a bag B. As shown in Fig. 7, the base plate 120 is recessed at 125 in order to fit into V-rails 125a, provided along the top of the channel mountings 58, permitting the sewing head 60 to slide along the channel mountings 58. The lower marginal edges 126 of the channel mountings 58 are recessed to receive a rubbing block 127, secured to the base plate 120 by means of spacers 128, and a pair of blocks 129 are secured to base plate 120, while another pair of blocks 130 are secured to the sides of the channel mountings 58, and a pair of coil springs 131, for returning the sewing head to its normal position are mounted between blocks 129 and 130. A block 132, mounted on the front of the base plate 120, is adapted to hold a roller 133, which is disposed in juxtaposed relation to the cam 113, which is adapted to retract the sewing head 60, as hereinafter described.

A keyway 134 is provided along the splineshaft 62, while slidably thereon is a gear 135 having its collar recessed at 136 to receive a yoke 137, secured to the base plate 120. A gear 138 mounted on the frame 119, cooperates with gear 135, to reciprocate the needle 122, in an obvious manner, while a key 139 is secured to gear 135, as by welding indicated at 140. Fig. 8 illustrates the cam 113 and associated parts in one operative position, while Fig. 9 illustrates the same parts in another operative position, the bag B having the sealing tape 79 folded around its marginal edges.

As the cam 113 rotates and its surface 141 engages roller 133, springs 131 hold the sewing head 60 to provide the normal straight line of stitches, which sew the tape 79 to the top margin of the bag B as illustrated in Fig. 8, whereas Fig. 9 illustrates the position of the same parts when the cam 113 has been rotated so that its surface 142, bearing against roller 133 carries the sewing head 60 away from its normal position, illustrated above, producing the row of offset stitches illustrated at 161, wherein the stitches sew through the tape only just below the upper margin of the bag.

As continued rotation of the cam 113 returns it to the position shown in Fig. 8, the springs 131 urge the sewing head 60 towards the opposite end of the bag B, and the gear 135 has slid along the splined surface of its shaft 62 and transmitted the rotation to gear 138, which caused reciprocation of needle 122, while the sewing head 60 was reciprocated.

Figures 22, 23:
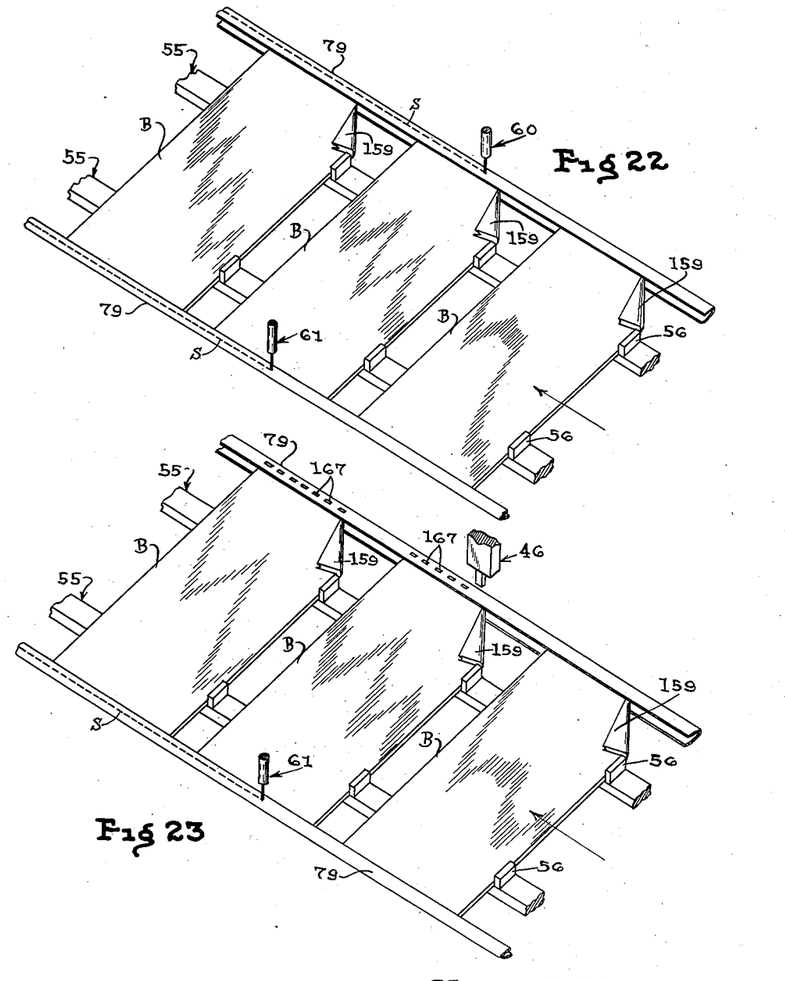
Fig. 22 is a perspective view of a plurality of modified type of valve bags, being conveyed through the machine, with sealing tape being sewed over the ends.
Fig. 23 is a view similar to Fig. 22 showing stapling operation at one end.
Figure 27:
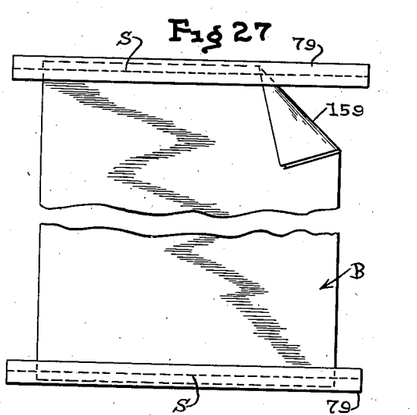
Fig. 27 is an elevational view of a bag having a folded corner valve.

The machine herein described is adapted to be set up to fold over a corner of the bag, as illustrated in Figs. 22, 23 and 27, and in order to manufacture such type of bag, the flat plate 48 and gusset-valving mechanism 50 are removed from the machine, and receiving plate 143 and associated mechanism 144 are suitably secured to the machine in place thereof, as shown in Figs. 10 through 15. Such corner folding mechanism comprises a receiving arm 145 and a folding member 146, secured to a sliding block 147, slidably mounted in a channeled block 148, while a coiled spring 149, connected to the folding member 146 and the block 148, returns the folding member to the position shown in Fig. 13, after it has completed the folding operation.

Figures 11, 12, 13, 14, 15:
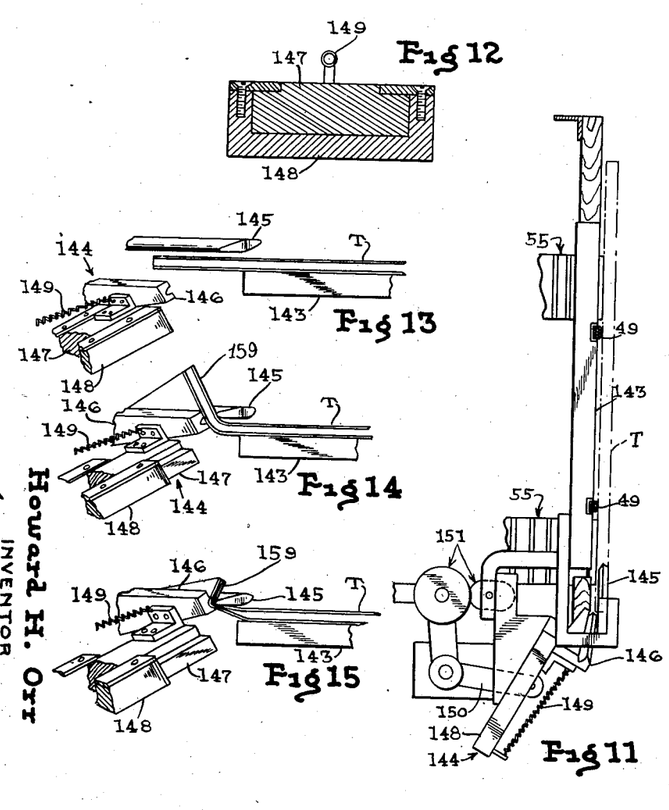
Fig. 11 is an end elevational view of Fig. 10.
Fig. 12 is an enlarged vertical sectional view taken on the line 12—12 of Fig. 10.
Fig. 13 is a fragmentary prospective view of the valve forming attachment, taken on the line 13—13 of Fig. 10.
Fig. 14 is a view similar to Fig. 13, showing a corner of a bag partially folded.
Fig. 15 is a similar view to Fig. 13, showing a corner of a bag folded over.
Figure 16:
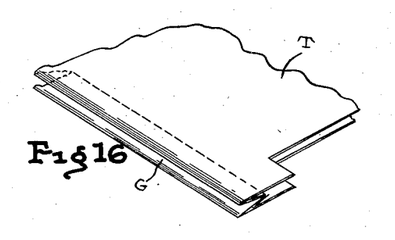
Fig. 16 is a perspective view of a single ply, gusseted bag before the valve forming mechanism has started to operate.

A cam mechanism 151 and cooperating arm 150, serve to move the block 147, toward the receiving arm 145. The cam mechanism 151 is actuated by the pedal 116 and cooperating clutch 114, the receiving plate 48 and 143 being constructed and arranged so as to be interchangeable in this respect. Fig. 13 shows a tube T on the receiving plate 143, before the folding member 146 has started its movement toward the receiving arm 145. Fig. 14 shows the folding member 146 partially moved toward the arm 145, the corner of the tube T being partially lifted, while Fig. 15 shows the completed movement with folding member 146 engaging the tube T, which is pressed against the receiving arm 145, the corner of the tube T being folded over, so that the tube T is ready to be conveyed to the part of the machine which seals the bag ends after the folding member 146 is retracted. The channel 152 in the receiving arm 145 is provided for folding the corners of tubes having a plurality of plies, in order to accommodate the additional thickness when folding.

Figures 20, 21:
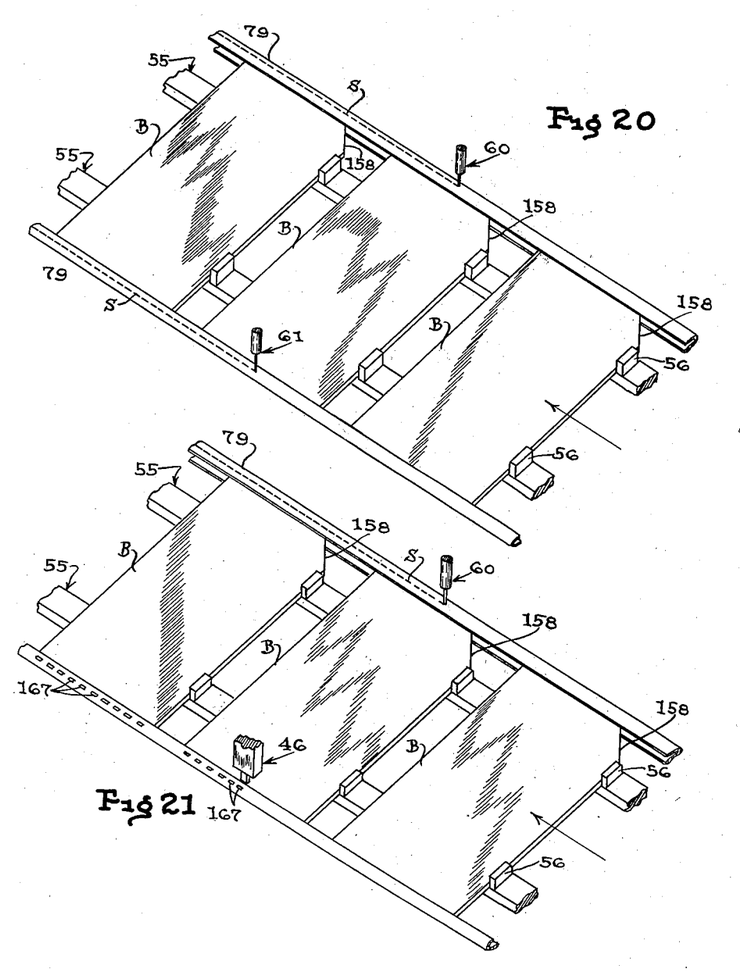
Fig. 20 is a perspective view of a plurality of bags, of one type being conveyed through the machine, showing sealing tape being sewed over the ends.
Fig. 21 is a view similar to Fig. 20, showing stapling operation at one end.
Figure 26:
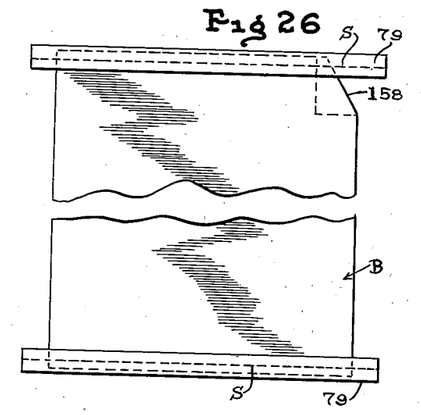
Fig. 26 is an elevational view of a bag having a tucked-in gusset valve.

The machine is also adapted to be operated to provide tucked in gusset valves, formed in the upper corner of a bag, of the type illustrated in Figs. 20, 21 and 26. To produce such bags the flat plate 48, with its gusset folding mechanism 50, is secured to the machine, the cam 113 is removed and the stapling device 46 is slid back, and sewing heads 60 and 61 are secured to the channel mountings 58. As the gusset-valving mechanism is fully disclosed in my Patent No. 1,926,241, issued September 12, 1933, the same will be only briefly described herein, and is shown in Figs. 1 through 3.

Figure 17:
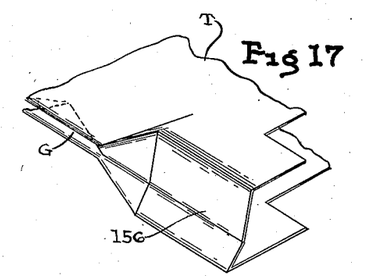
Fig. 17 is a perspective view of a single ply bag after the first movement of the valve forming mechanism has taken place.
Figure 18:
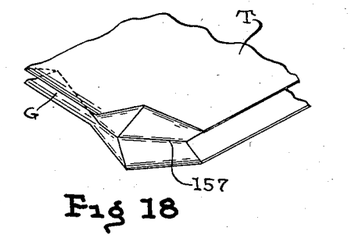
Fig. 18 is a perspective view of a single ply bag, after the second movement of the valve forming mechanism has taken place.
Figure 19:
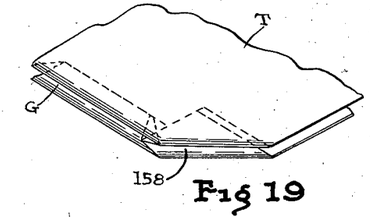
Fig. 19 is a perspective view of the valve after it has been formed.

A holder 153, is provided for holding the tube T against the plate 48, and a pair of spreader fingers 154 are provided for opening the gusset outwardly, into the position shown at 156 in Fig. 17, and a tucking plate 155, swinging pivotally, tucks the corner inwardly into the form shown at 157, in Fig. 18. The holder 153 then releases the tube and it is conveyed into the machine with the valve formed as illustrated at 158 in Fig. 19, and rollers 91 and 93 crease the plies, to hold the valve in shape, as it passes between them. The above operations are initiated by actuating pedal 117 to start the motor 83, then placing a tube T on the flat plate 48 and then actuating pedal 116 which through clutch 114 operates gusset-valving mechanism 50.

Fig. 20 shows the sewing operation, which occurs after the valving operation, as the bags B are being moved under the sewing heads 60 and 61 by the conveyor belts 55. Sealing tape 79 has been folded over the ends of the bags and adhesively secured thereto, as previously described and the stitches are applied in straight lines, as a continuous operation. For certain purposes the bag illustrated in Fig. 21 may be desired, wherein stapling device 46 is used to insert staples 167 through the tape 79 along the bottom of the bag, in the place of the sewing head 61, while the normal stitching operation continues along the top of the bag. A completed bag, after the severing of the tape 79 by the cutting device, is shown in Fig. 26.

In order to produce a completed bag having a folded over corner, as illustrated in Fig. 27, another receiving plate 143 and associated mechanism are substituted for the plate 48 and gusset valving mechanism 50. The stapling device 46 is slid back and sewing heads 60 and 61 are secured to the channel mountings 58. A tube T is then placed on the receiving plate 143, the pedal 116 is pressed and a corner is folded over, forming a valve 159 by the mechanism shown in Figs. 13 through 15. The conveyor belts 49 carry the bag to conveyors 55 and, as shown in Fig. 22, sewing heads 60 and 61 stitch the tape to the bag ends in straight lines. For certain types of bags, the stapling device 46 may be substituted for the sewing heads along the top of the bag, as shown in Fig. 23.

Figures 24, 25:
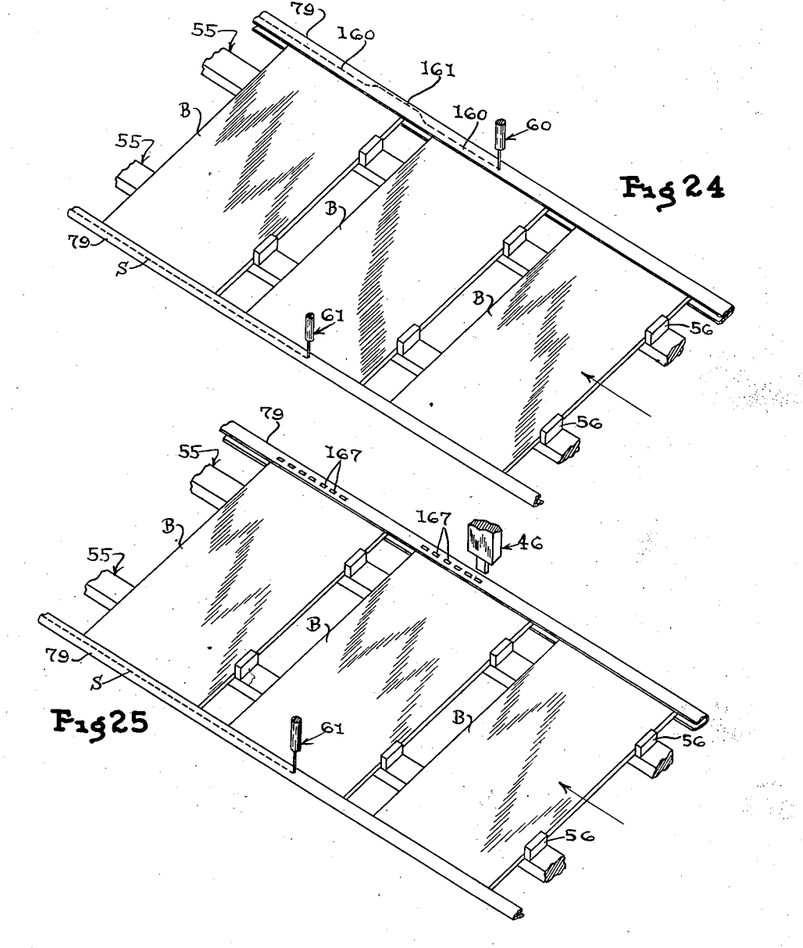
Fig. 24 is a perspective view of a series of another type of valve bag, being conveyed through the machine, with sealing tape being sewed over the ends.
Fig. 25 is a view similar to Fig. 24, showing stapling operations in place of sewing at one end of the bag.
Figure 28:
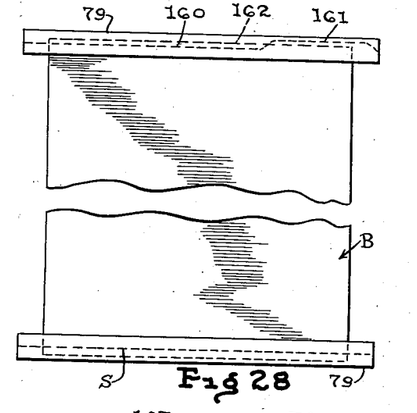
Fig. 28 is an elevational view of a bag having an offset sewing valve.

In order to produce a bag having offset stitching through the tape, of the type illustrated in Figs. 24, 25 and 28, any suitable receiving plate, preferably one without any bag valve forming mechanism, is set up on the machine and the sewing heads 60 and 61 are mounted on the channel mounting 58, the sewing head 60 being reciprocably mounted for movement to and away from the bag end, as illustrated in Fig. 6, while the sewing head 61 is rigidly mounted for sewing in a straight line across the bottom of the bag.

When the cam 113 is rotated to a certain point, as previously described herein, it reciprocates sewing head 60 outwardly sufficiently to produce the offset line of stitches illustrated at 161, wherein the stitches thereof positioned parallel to the upper margin of the bag lie above the upper bag margin 162, and thus such stitches extend through the tape only, without touching the bag margin 162, and such portion of the tape 79 may be lifted therefrom for a filling operation, and may be secured to the bag margin by any suitable means, as by sewing, stapling or the like, after the bag is filled, to provide a neat appearing leak-proof bag.

Figure 29:
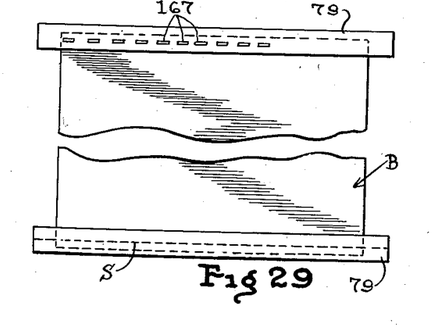
Fig. 29 is an elevational view of a bag, corresponding to Fig. 28, showing stapling in place of sewing.

Continued rotation of the cam 113 results in the sewing head 60 returning to its normal position in time to sew across the top of the next bag, until the sewing head 60 is again retracted, as above described. The bag shown in Fig. 25 is produced by substituting the stapling device 46 for the sewing head 60, for providing a line of staples corresponding in position to the non-offset line of stitching above described. The number of staples to be inserted is regulated by the number of fingers 105, positioned on the finger holder 104, which is operated as previously described, and illustrated in Fig. 4. Straight line of stitching by sewing head 61, is produced at the bottom of the bag. Fig. 29 illustrates a completed bag of this type.

Figure 30:
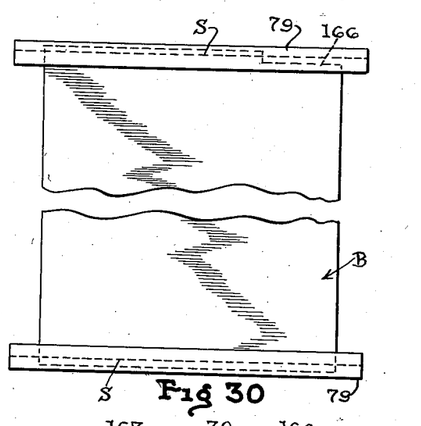
Fig. 30 is an elevational view of a bag with the corner cut away to form a valve.
Figure 31:
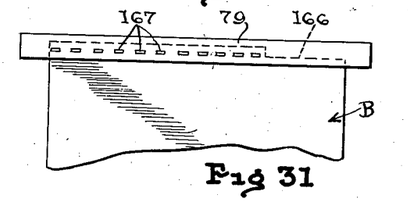
Fig. 31 is an elevational view of a bag, corresponding to Fig. 3, showing stapling substituted for sewing.

Somewhat the same type of bag may be produced by cutting out a portion of the upper corner of the bag indicated by the numeral 166 in Figs. 30 and 31, in such manner that the normal straight line of stitches along the top margin of the bag, sews through the tape and bag, except where the bag is cut out at 166, where the stitches proceed through the tape only, which provides a bag filling opening, as above described, and the tape 79 may be secured to the filled bag in any desired manner. Fig. 31 shows a similar type of bag, varying from the above by the substitution of a row of staples 167 for that part of the above described stitching which sews through the tape and bag, and by terminating the row of staples at the point where the offset stitching commenced, thus leaving a part of the tape 79 available for filling of the bag.

It will be apparent to those skilled in the art that the invention herein disclosed may be variously changed, used or modified without departing from the spirit of the invention, and that the embodiment of my invention herein disclosed is illustrative only and that my invention is not limited thereto.

I claim:

1. A method of manufacturing bags from flat tubular bag stock, comprising: folding a strip of flexible material over the end thereof, sewing said strip to a part of said bag end by a row of stitches extending continuously through said strip entirely across said bag end, and offsetting said row of strip stitches for a part of the distance along the bag end in such a manner that such stitches extend through the strip only beyond the bag end near the strip fold, thereby providing an initially unsecured strip portion overlying the bag end, for the purposes described.

2. A method of manufacturing bags from flat tubular bag stock, comprising: folding strips of flexible material over the top and bottom margins thereof, sewing said strip to a part of the top bag and by a row of stitches extending continuously through said strip entirely across said bag end, and offsetting said row of strip stitches for a part of the distance along the bag end in such a manner that such stitches extend through the strip only beyond the bag end near the fold thereof, and simultaneously sewing said strip along the bottom bag margin thereby providing an initially unsecured strip portion overlying the top bag end, and a permanent material holding seam along the bag bottom.

3. In a machine for making bags from flat tubular bag-length stock, conveyor means for conveying a series of bags through said machine, means for driving said conveyor means, stitching means for sewing a folded over strip of material to the top bag margins, and means also driven by said driving means for causing a relative movement between each bag and said stitching means as each bag is advanced by said conveyor means to cause said stitching means to sew said strip to the top of each bag from one side wall partially across the bag end and from there to sew through said strip only beyond the top bag margin to the opposite side thereof, thereby providing an initially unattached strip portion permitting a bag filling operation.

4. In a machine for making bags from flat tubular bag-length stock, conveyor means for conveying a series of bags through said machine, means for folding a strip of material over the top bag margin, means for driving said conveyor means, stitching means for sewing said folded over strip of material to the top bag margins, and means also driven by said driving means for causing a relative movement between each bag and said stitching means as each bag is advanced by said conveyor means to cause said stitching means to sew said strip to the top of each bag from one side wall partially across the bag end and from there to sew through said strip only beyond the top bag margin to the opposite side thereof, thereby providing an initially unattached strip portion permitting a bag filling operation.

5. In a machine for making bags from flat tubular bag-length stock, conveyor means for conveying a series of bags through said machine, means for driving said conveyor means, stitching means for sewing a folded over strip of material to the top bag margins, and a rotating cam also driven by said driving means for causing a relative movement between said stitching means in synchronized relation to the movement of each bag by said conveyor means, for causing said stitching means to sew said strip to the top of each bag from one side wall partially across said bag end and from there to sew through said strip only beyond the top bag margin near the fold thereof to the opposite bag side, for the purposes described.

6. In a machine for making bags from flat tubular bag-length stock, conveyor means for conveying a series of bags through said machine, means for folding a strip of material over the top bag margin, means for driving said conveyor means, stitching means for sewing said folded over strip of material to the top bag margins, means for severing said strip beyond the sides of said bag, and means also driven by said driving means for causing a relative movement between each bag and said stitching means as each bag is advanced by said conveyor means to cause said stitching means to sew said strip to the top of each bag from one side wall partially across the bag end and from there to sew through said strip only beyond the top bag margin to the opposite side thereof, thereby providing an initially unattached strip portion permitting a bag filling operation.

7. In a machine for making bags of the type described, conveyor means for conveying a series of bags sidewise through said machine, means for driving said conveyor means, reciprocably mounted stitching means for sewing a folded-over strip of material to said top bag margins, adapted to be reciprocated towards and away from the top ends of said bags as they are advanced by said conveyor, and means also driven by said driving means for reciprocating said stitching means in synchronized relation to the movement of bags through said machine, and causing said stitching means to sew said strip to each bag end partially across the bag top and from there to sew through said strip only beyond the top bag margin to the opposite side thereof, for the purposes described.

8. In a machine for making bags of the type described, conveyor means for conveying a series of bags sidewise through said machine, means for driving said conveyor means, reciprocably mounted stitching means for sewing a folded-over strip of material to said top bag margins, adapted to be reciprocated towards and away from the top ends of said bags as they are advanced by said conveyor, and a rotating cam also driven by said driving means for reciprocating said stitching means in synchronized relation to the movement of bags through said machine and causing said stitching means to sew said strip to each bag and partially across the bag top and from there to sew through said strip only beyond the top bag margin to the opposite side thereof, for the purposes described.

9. In a machine for making bags of the type described, conveyor means for conveying a series of bags sidewise through said machine, means for driving said conveyor means, a support member adapted to be reciprocated towards and away from the top ends of said bags as they are advanced by said conveyor, a stitching means mounted on said member for sewing a folded-over strip of material to said top bag margins, and means also driven by said driving means for reciprocating said member and stitching means in synchronized relation to the movement of bags through said machine for causing said stitching means to sew said strip to each bag end partially across the bag top and from there to sew through said strip only beyond the top bag margin to the opposite side thereof, for the purposes described.

10. In a machine for making bags of the type described, conveyor means for conveying a series of bags sidewise through said machine, means for driving said conveyor means, a support member provided with a follower member and adapted to be reciprocated towards and away from the top ends of said bags as they are advanced by said conveyor, a stitching means mounted on said support member for sewing a folded-over strip of material to said top bag margins, and a rotating cam cooperating with said follower member on said support member, and also driven by said driving means, for reciprocating said support member and stiching means in synchronized relation to the movement of bags through said machine for causing said stitching means to sew said strip to each bag end partially across the bag top and from there to sew through said strip only beyond the top bag margin to the opposite side thereof, for the purposes described.

HOWARD H. ORR.